US011751532B2

(12) United States Patent
Paxson et al.

(10) Patent No.: US 11,751,532 B2
(45) Date of Patent: Sep. 12, 2023

(54) PET ENCLOSURE

(71) Applicant: Doskocil Manufacturing Company, Inc., Arlington, TX (US)

(72) Inventors: Ryan Paxson, Elk Rapids, MI (US); David Veness, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 16/952,404

(22) Filed: Nov. 19, 2020

(65) Prior Publication Data
US 2021/0153450 A1    May 27, 2021

Related U.S. Application Data

(60) Provisional application No. 62/938,719, filed on Nov. 21, 2019.

(51) Int. Cl.
*A01K 1/00*    (2006.01)
*A01K 1/01*    (2006.01)

(52) U.S. Cl.
CPC .......... *A01K 1/0058* (2013.01); *A01K 1/0103* (2013.01)

(58) Field of Classification Search
CPC ........ A01K 1/035; A01K 1/033; A01K 1/032; A01K 1/031; A01K 1/0245; A01K 31/00; A01K 31/002; A01K 31/06; A01K 31/08; A01K 31/18; A01K 31/24
USPC .............. 52/81.6, 79.1, 79.4, 272, 283, 274
See application file for complete search history.

(56) References Cited

U.S. PATENT DOCUMENTS

| | | | | |
|---|---|---|---|---|
| D202,880 S | * | 11/1965 | Cameron | D13/1 |
| 4,031,572 A | * | 6/1977 | Harding | A47K 11/02 4/111 |
| D298,357 S | * | 11/1988 | Adams | D25/16 |
| D320,479 S | * | 10/1991 | Cheval | D25/1 |
| 5,575,239 A | * | 11/1996 | Bradburn | A01K 1/02 119/500 |
| 6,067,939 A | * | 5/2000 | Tominaga | A01K 1/03 119/500 |
| 6,571,470 B1 | | 6/2003 | Mortzheim et al. | |
| D481,833 S | | 11/2003 | Vanskiver | |
| D488,266 S | | 4/2004 | Vanskiver | |
| D555,294 S | | 11/2007 | Northrop | |
| D575,907 S | | 8/2008 | Roderman et al. | |

(Continued)

OTHER PUBLICATIONS

IRIS IDH-L Large Igloo Shaped Dog House, Jun. 21, 2019.
Petmate Booda Dome Litter Box, May 12, 1998.
Key Shelter Assortment, Petmate, 2019.

*Primary Examiner* — Joshua E Rodden
*Assistant Examiner* — Henry Hooper Mudd
(74) *Attorney, Agent, or Firm* — GLOBAL IP COUNSELORS, LLP

(57) ABSTRACT

A pet enclosure includes a bottom section, a middle section, and a top section. The middle section is connectable to the bottom section with an opening in the middle section. The opening in the middle section has a bottom portion that connects with a top portion of an opening in the bottom section. The top section is connectable to the middle section with an opening in the top section. The opening in the top section has a bottom portion that connects with a top portion of an opening in the bottom section. The bottom section, middle section and top section when connected together form an enclosed pet enclosure with an animal opening therein.

16 Claims, 13 Drawing Sheets

(56) References Cited

U.S. PATENT DOCUMENTS

| | | | | |
|---|---|---|---|---|
| 10,694,715 | B1* | 6/2020 | Edmonds | A01K 1/029 |
| 2014/0299068 | A1* | 10/2014 | Kupka | A01K 1/0107 |
| | | | | 119/501 |
| 2016/0366850 | A1* | 12/2016 | Robbins | A01K 1/03 |
| 2018/0103608 | A1* | 4/2018 | Bohline | A01K 1/015 |

* cited by examiner

PET ENCLOSURE

CROSS REFERENCE TO RELATED APPLICATION

This patent application claims priority to U.S. Provisional Patent Application No. 62/938,719, filed Nov. 21, 2019, the entire contents of which are incorporated herein by reference.

BACKGROUND

Field of the Invention

The present disclosure relates to a pet enclosure. In particular, the present disclosure relates to a pet enclosure that is easy to assembly and store.

Background of the Invention

Conventional pet enclosures are available in different sizes, shapes, and materials. Pet enclosures also can differ in the way in which they are manufactured and assembled. One type of conventional pet enclosure is built board-by-board from scratch using nails and other non-removable permanent fasteners for connecting the walls and roof. Another type of conventional pet enclosure is prefabricated in two pieces and has a separate roof that is fastened to a body of the pet enclosure.

SUMMARY

It has been found that an improved pet enclosure is desired. For example, it has been found that building a pet enclosure from scratch can involve excessive amounts of time and effort to plan and construct. Furthermore, many conventional pet enclosures are usually limited by a lack of mobility once the house is built, since the nails and other non-removable fasteners for connecting the adjoining walls are permanently fixed to the pet enclosure. Any holes created by nailing the boards together may become worn and loose once the nails are removed from the pet enclosure, thereby preventing the nails from being reinserted into the holes. Thus, this type of pet enclosure is not typically built to be disassembled and reassembled.

Other types of prefabricated pet enclosures require a significant amount of space to store or transport due to the bulkiness of the body and the roof, especially if the pet enclosure provides a large amount of interior space.

Some conventional pet enclosures use pegs for connecting walls or other portions of the pet enclosure. These types of fasteners do not provide a sufficient amount of strength and reliability, since the pegs can slip out of their respective holes.

Therefore, it has been determined that a pet enclosure that is sturdy and reliable and that can be assembled and reassembled without excessive wear and tear is desired. Additionally, it has been determined that a pet enclosure that can be stored and transported using a minimal amount of space while providing a large amount of interior space for the pet after the pet enclosure is assembled is desired.

In view of the state of the known technology, one aspect of the present disclosure is to provide a pet enclosure comprising a bottom section, a middle section, and a top section. The bottom section has a floor portion and a wall portion extending from the floor portion, the wall portion including a first opening having a bottom portion and a top portion. The middle section is connectable to the bottom section. The middle section includes a wall portion. The wall portion of the middle section includes a second opening having a bottom portion and a top portion. The bottom portion of the second opening has the same width as the top portion of the first opening so as to connect to with the first opening. The top portion of the second opening is inwardly curved such that a width of the top portion of the second opening is less than a width of the bottom portion of the second opening. The top section is connectable to the middle section, the top section includes a cover portion and a wall portion. The cover portion forms a domed cover, and the wall portion includes a third opening having a bottom portion and a top portion. The bottom portion of the third opening has the same width as the top portion of the second opening so as to connect with the second opening, and the top portion of the third opening is arcuate. The bottom section, middle section and top section when connected together form an enclosed pet enclosure with an animal opening therein.

A second aspect of the present disclosure is to provide the pet enclosure according to the first aspect, wherein the top section includes an opening for a vent.

A third aspect of the present disclosure is to provide the pet enclosure according to any of the previous aspects, wherein the animal opening forms an offset entry into the enclosed pet enclosure.

A fourth aspect of the present disclosure is to provide the pet enclosure according to any of the previous aspects, wherein the bottom edge of the wall of the top section includes a flange portion at that overlaps an exterior surface of the top edge of the wall of the middle section.

A fifth aspect of the present disclosure is to provide the pet enclosure according to any of the previous aspects, wherein an interior surface of the floor portion is raised relative to a surface on which the pet enclosure is to be position.

A sixth aspect of the present disclosure is to provide the pet enclosure according to any of the previous aspects, wherein the floor portion includes drainage holes.

A seventh aspect of the present disclosure is to provide the pet enclosure according to any of the previous aspects, wherein at least one of the drainage holes is configured to receive a ground stake.

An eighth aspect of the present disclosure is to provide the pet enclosure according to any of the previous aspects, wherein a groove is disposed between the wall portion of the bottom section and a surface of an interior surface of the floor portion.

A ninth aspect of the present disclosure is to provide the pet enclosure according to any of the previous aspects, wherein the wall portion of the bottom portion includes a plurality of first fastening openings at a top edge thereof, a bottom edge of the wall portion of the middle section includes a plurality of second fastening openings configured to correspond to the plurality of first fastening openings at the top edge of the wall portion of the bottom section, and a top edge of the wall portion of the middle section includes a plurality of third fastening openings, and a bottom edge of the wall portion of the top section including a plurality of fourth fastening openings configured to correspond to the plurality of third fastening openings at the top edge of the wall portion of the middle section.

A tenth aspect of the present disclosure is to provide a method of assembling a pet enclosure. The method comprises connecting a middle section to a bottom section, such that a top portion of a first opening of the bottom section coincides with a bottom portion of a second opening of the middle section, and a top portion of the second opening is inwardly curved such that a width of the top portion of the second opening is less than a width of the bottom portion of the second opening, fastening the middle section to the bottom section by inserting fasteners through a plurality of first fastening openings at the top edge of the wall portion of the bottom section and a plurality of second fastening openings at a bottom edge of the wall portion of the middle section, connecting a cover portion to the middle section so as to form a domed cover, and such that a bottom portion of a third opening in a wall of the cover portion coincides with a top portion of the second opening in the middle section, and the top portion of the third opening being arcuate, and fastening the top section to the middle section by inserting fasteners through a plurality of third fastening openings at a top edge of the wall portion of the middle section and a plurality of fourth fastening openings at a bottom edge of the wall portion of the top section, the bottom section, middle section and top section when connected together forming an enclosed pet enclosure with an animal opening therein.

An eleventh aspect of the present disclosure is to provide a method according to any of the previous aspects, wherein the top section includes an opening for a vent.

A twelfth aspect of the present disclosure is to provide a method according to any of the previous aspects, wherein the animal opening forms an offset entry into the enclosed pet enclosure.

A thirteenth aspect of the present disclosure is to provide a method according to any of the previous aspects, wherein the bottom edge of the wall of the top section includes a flange portion at that overlaps an exterior surface of the top edge of the wall of the middle section.

A fourteenth aspect of the present disclosure is to provide a method according to any of the previous aspects, wherein an interior surface of the floor portion is raised relative to a surface on which the pet enclosure is to be position.

A fifteenth aspect of the present disclosure is to provide a method according to any of the previous aspects, wherein the floor portion includes drainage holes.

A sixteenth aspect of the present disclosure is to provide a method according to any of the previous aspects, wherein at least one of the drainage holes is configured to receive a ground stake.

A seventeenth aspect of the present disclosure is to provide a method according to any of the previous aspects, wherein a groove is disposed between the wall portion of the bottom section and a surface of an interior surface of the floor portion.

An eighteenth aspect of the present disclosure is to provide a method according to any of the previous aspects, further comprising fastening the middle section to the bottom section by inserting fasteners through a plurality of first fastening openings at the top edge of the wall portion of the bottom section and a plurality of second fastening openings at a bottom edge of the wall portion of the middle section, and fastening the top section to the middle section by inserting fasteners through a plurality of third fastening openings at a top edge of the wall portion of the middle section and a plurality of fourth fastening openings at a bottom edge of the wall portion of the top section.

As can be understood, these aspects of the present invention, and additional aspects as described herein provide a pet enclosure that is a sturdy and reliable prefabricated pet enclosure that be assembled and reassembled without excessive wear and tear is desired. Additionally, these aspects of the present invention, and additional aspects as described herein provide a pet enclosure that can be stored and transported using a minimal amount of space while providing a large amount of interior space for the pet after the pet enclosure is assembled is desired.

BRIEF DESCRIPTION OF THE DRAWINGS

The invention will be explained in more detail hereinafter with reference to the drawings.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
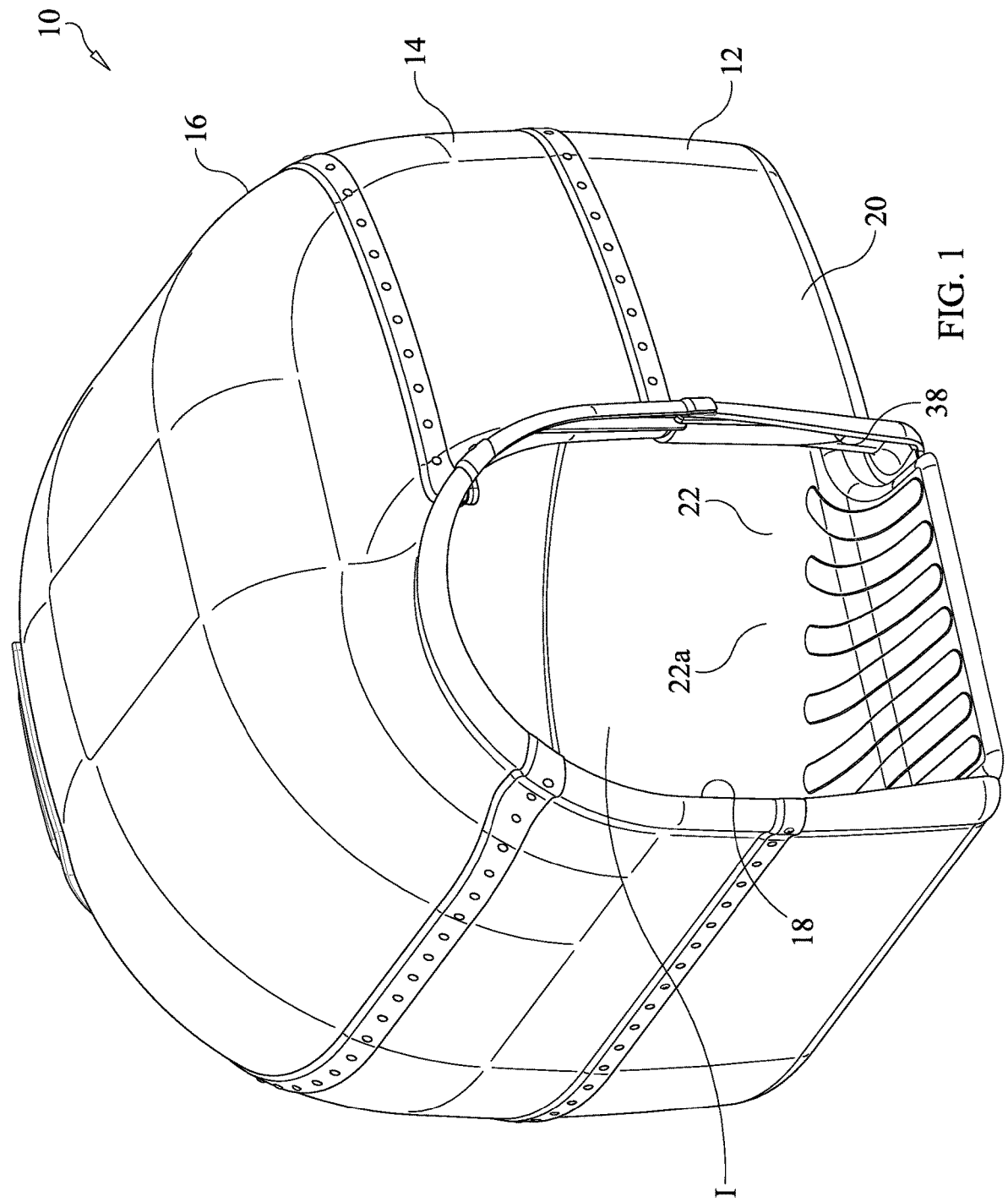
FIG. 1 is a top perspective view of the a pet enclosure according to an embodiment of the present invention.
Figure 2:
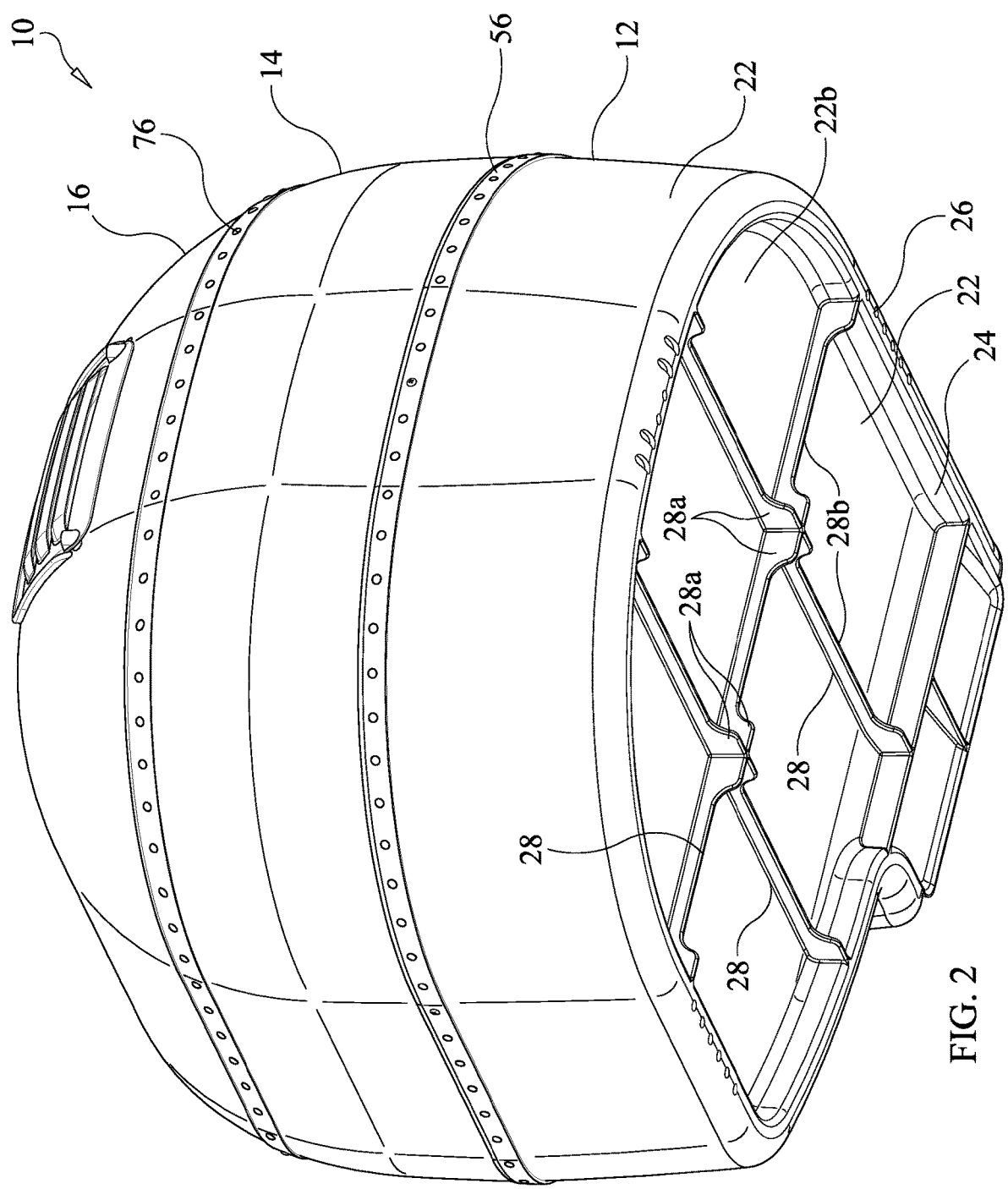
FIG. 2 is a bottom perspective view of the pet enclosure of FIG. 1.

Referring initially to FIG. 1, a pet enclosure 10 is illustrated in accordance with an embodiment. In the illustrated embodiment, the pet enclosure 10 can be a doghouse and include a bottom section 12, a middle section 14, and a top section 16. As will be discussed in more detail, the bottom section 12 is connectable to the middle section 14, which is in turn connectable to the top section 16. Each of the bottom section 12, a middle section 14 and a top section 16 is preferably molded plastic but can be formed from any type of material and in any manner desired. When connected together the bottom section 12, a middle section 14 and a top section 16 form a sturdy and reliable pet enclosure 10 with an offset opening 18 into the interior of the pet enclosure 10.

As illustrated in FIGS. 1-4, the bottom section 12 has a wall portion 20 and a floor portion 22, with the wall portion 20 extending from the floor portion 22. The floor portion 22 has an interior (first) side 22a and an exterior (second) side 22b. The exterior side 22b is recessed relative to an lip 24 that extends around the periphery 26 of the exterior side 22b. Extending between portions of the periphery 26 are a plurality of protrusions 28 that form a grid along the exterior side 22b. Each of the protrusions 28 has a raised portion 28a at the ends thereof. That is, the raised portions 28a extend farther from the exterior side 22b than the middle recessed portions 28b. The grid of protrusions 28 improves the structural integrity of the floor portion 22. As can be understood, not only do the protrusions 28 act like joists in a floor to improve the rigidity of the floor portion 22, but the raised portions 22a are configured to contact or rest on the surface that the pet enclosure 10 is located. Thus, the raised portions 28a, along with the lip 24 support the floor portion 22 and thus the weight of the pet enclosure 10.

Figure 12:
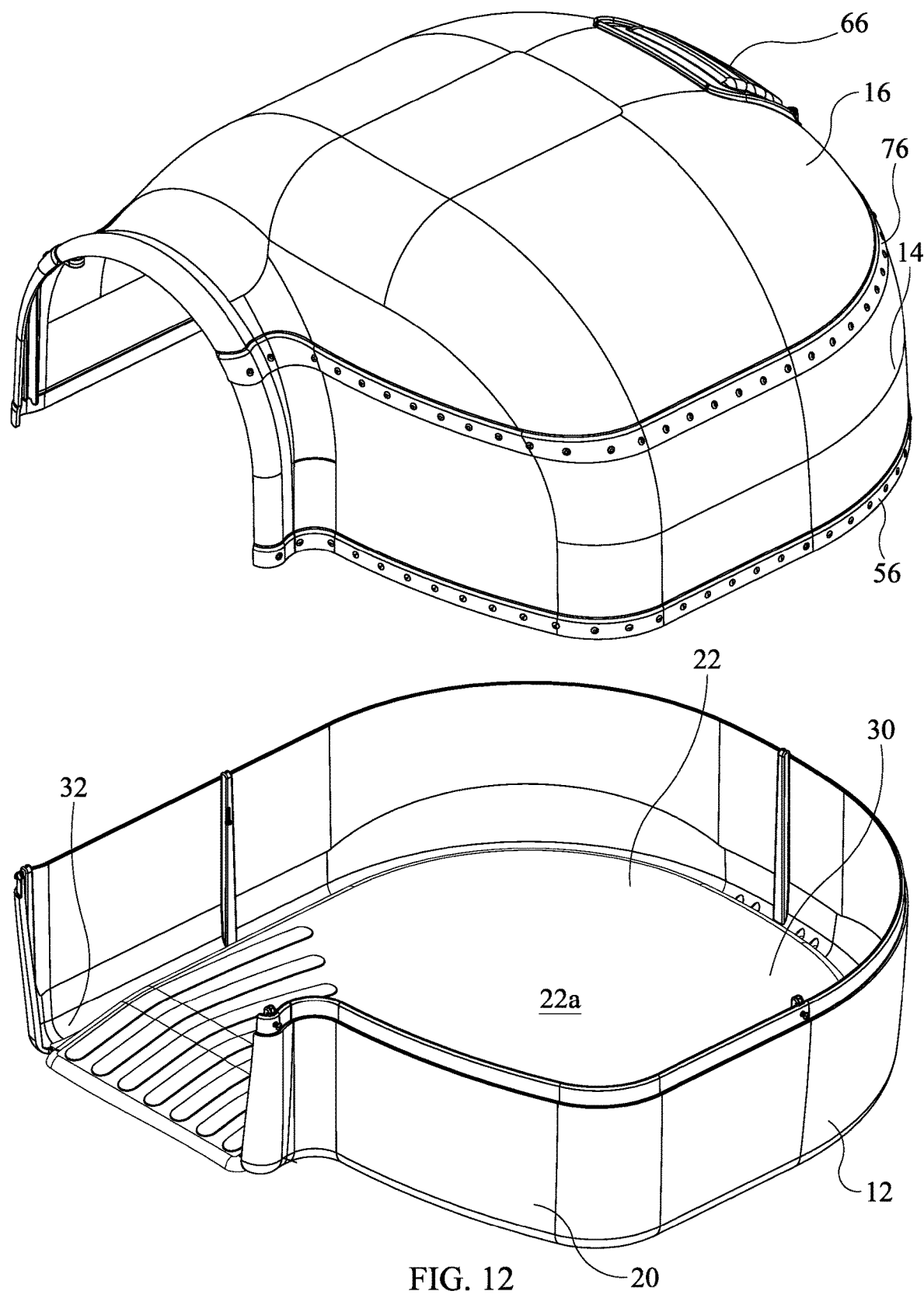
FIG. 12 is a partially exploded top perspective view of the pet enclosure of FIG. 1.
Figure 14:
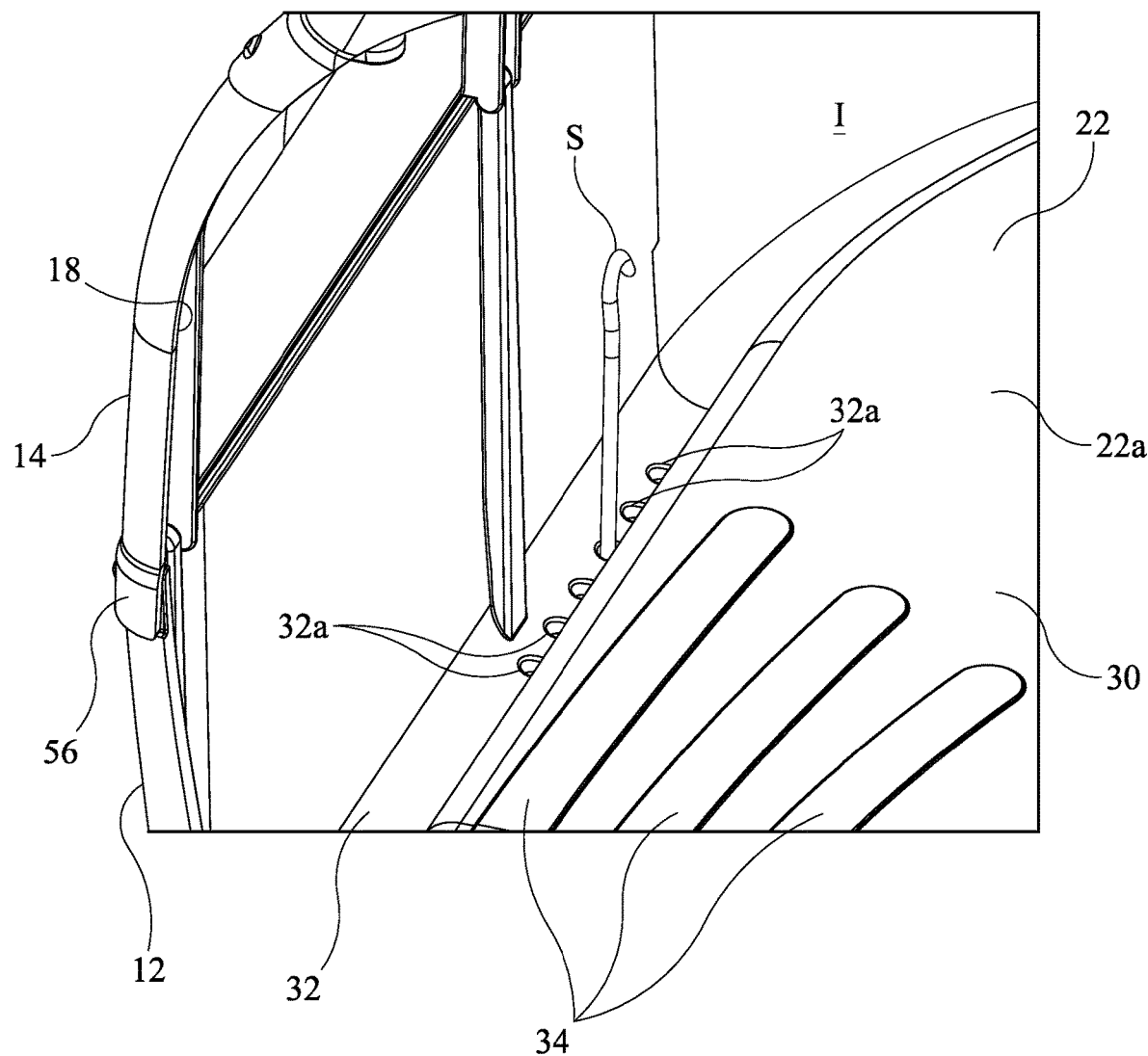
FIG. 14 is an enlarged interior view illustrating a stake connecting the pet enclosure to the ground.

The interior side 22a is a generally smooth comfortable surface. As can be seen for example in FIG. 7, the surface 30 of the interior side 22a of the floor portion 22 is raised relative to a surface on which the pet enclosure 10 is to be position. As illustrated in FIGS. 12 and 14, in one embodiment, the interior side 22a includes a groove 32 that is disposed between the wall portion 20 of the bottom section 12 and the surface of the interior side 22a of the floor portion 22. In this embodiment, the groove 32 extends around the periphery of the interior side 22a and is configured to enable liquids or other fluids to drain off of the surface 30 of the interior side 22a and into the groove 32. The groove 32 can also include a plurality of drainage holes 32a, which allow any fluids or liquids to drain out of the interior of the pet enclosure 10. Moreover, since the floor portion 22 is raised relative to a surface on which the pet enclosure 10 is to be position, any liquids or fluids can easily exit the interior I of the pet enclosure 10 and drain into the area below the floor portion 22. Further, all or some of the drainage holes can configured to receive a ground stake S. Thus, as can be understood, when it is desired to maintain the pet enclosure 10 in a specific position, a ground stake S can be inserted through the drainage holes 32a and into the ground, thereby securing the pet enclosure 10 into a specific or desired position on the ground.

Figure 9:
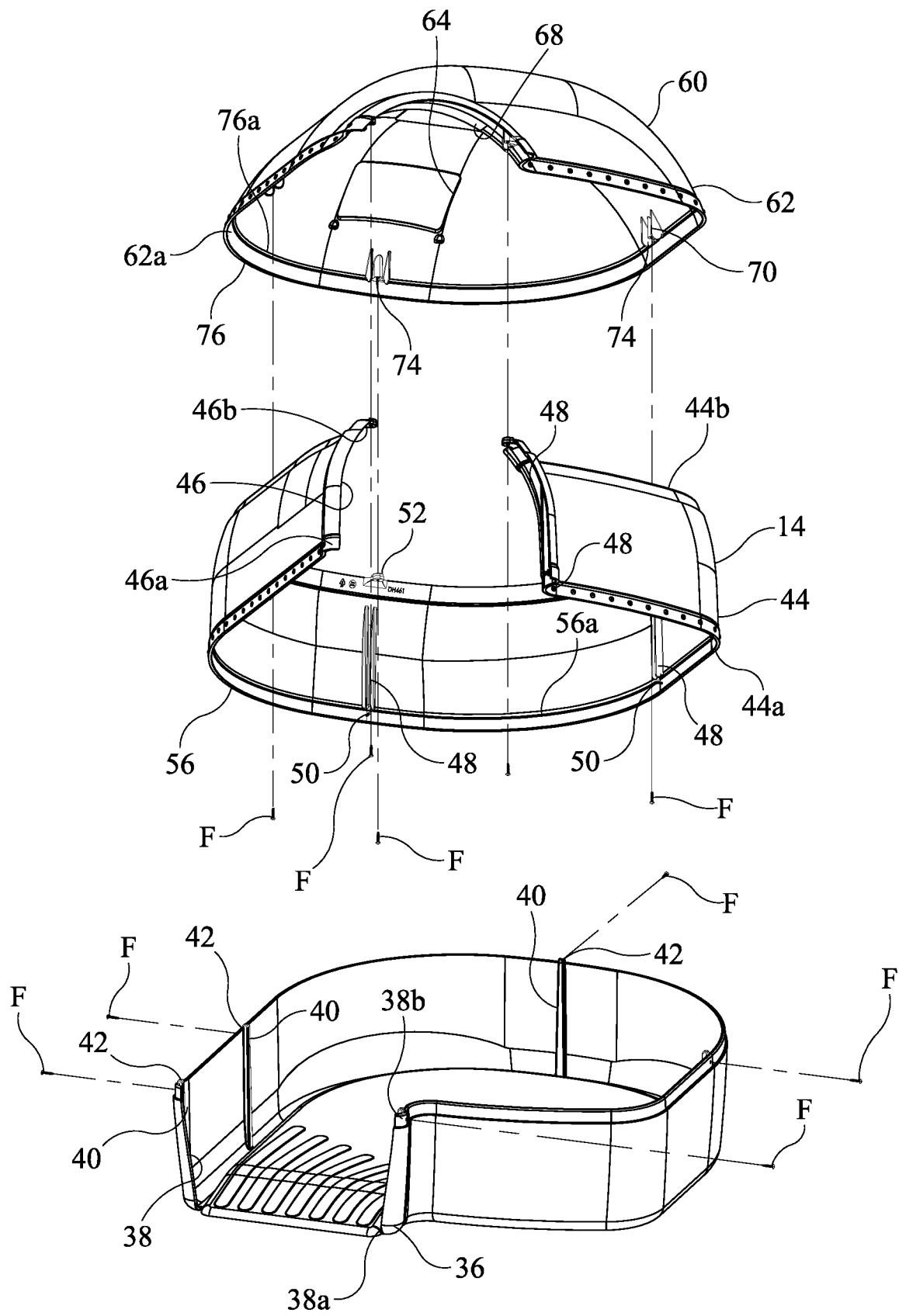
FIG. 9 an exploded top perspective view of the pet enclosure of FIG. 1.

The surface 30 of the interior side 22a also includes a mat at the opening 18. In one embodiment, the mat is a series of grooves 34 that can be molded into the surface 30 of the interior side 22a. These grooves 34 enable improved gripping upon entry into and exiting out of the interior of the pet enclosure 10. Furthermore, the grooves 34 can trap dirt and other materials that may be on the animal's paws or feet as the animal enters the pet enclosure 10. In some embodiments, the grooves 34 can be replaced or filled with a gripping material to further enhance grip upon entry and exit of the pet enclosure 10. As illustrated in FIG. 9, the grooves 34 can have a curved configuration, with the grooves 34 curving or bending in the direction of or towards the center of the floor portion 22. In one embodiment, the grooves 34 bend progressively more and extend progressively less from left to right when viewed from the exterior of the pet enclosure 10.

The floor portion 22 is generally rectangular with an extended portion 36 at the entry or opening 18 of the pet enclosure 10. This extended portion 36 generally forms an L-shape in the floor portion 22 when viewed from above. As illustrated, although generally rectangular, the floor portion 22 has rounded corners to provide a comfortable interior I for an animal. It is noted that the grooves 34 are disposed at least partially on the extended portion 36, which acts as an entry into the interior of the pet enclosure 10.

The wall portion 20 extends transverse, and preferably substantially perpendicularly from the floor portion 22. The wall portion 22 includes an (first) opening 38 that spans about the same length as the width of the extended portion 36. Thus, the combination of the extended portion 36 and the opening 18 serve as an entry way into the interior I of the pet enclosure 10. The wall portion 20 has the same configuration as the periphery of the floor portion 22, and as noted in FIG. 2 can extend downwardly to form the lip 24.

The wall portion 20 can include a plurality of longitudinal protrusions 40 that increase the strength and rigidity of the wall portion 20. In some embodiments, the longitudinal protrusions 40 can be disposed adjacent the opening 38 and along the straight areas of the wall portion 20, or any other section of the wall portion 20 which may have reduced structural integrity. Moreover, the longitudinal protrusions 40 can each include a fastener opening 42, since the longitudinal protrusions 40 will provide increased structural integrity. Thus, as can be understood, the wall portion 20 includes a plurality of (first) fastening openings 42 at a top edge thereof. The plurality of fastening openings 42 extend transversely to the direction of the wall portion 20.

Figure 7:
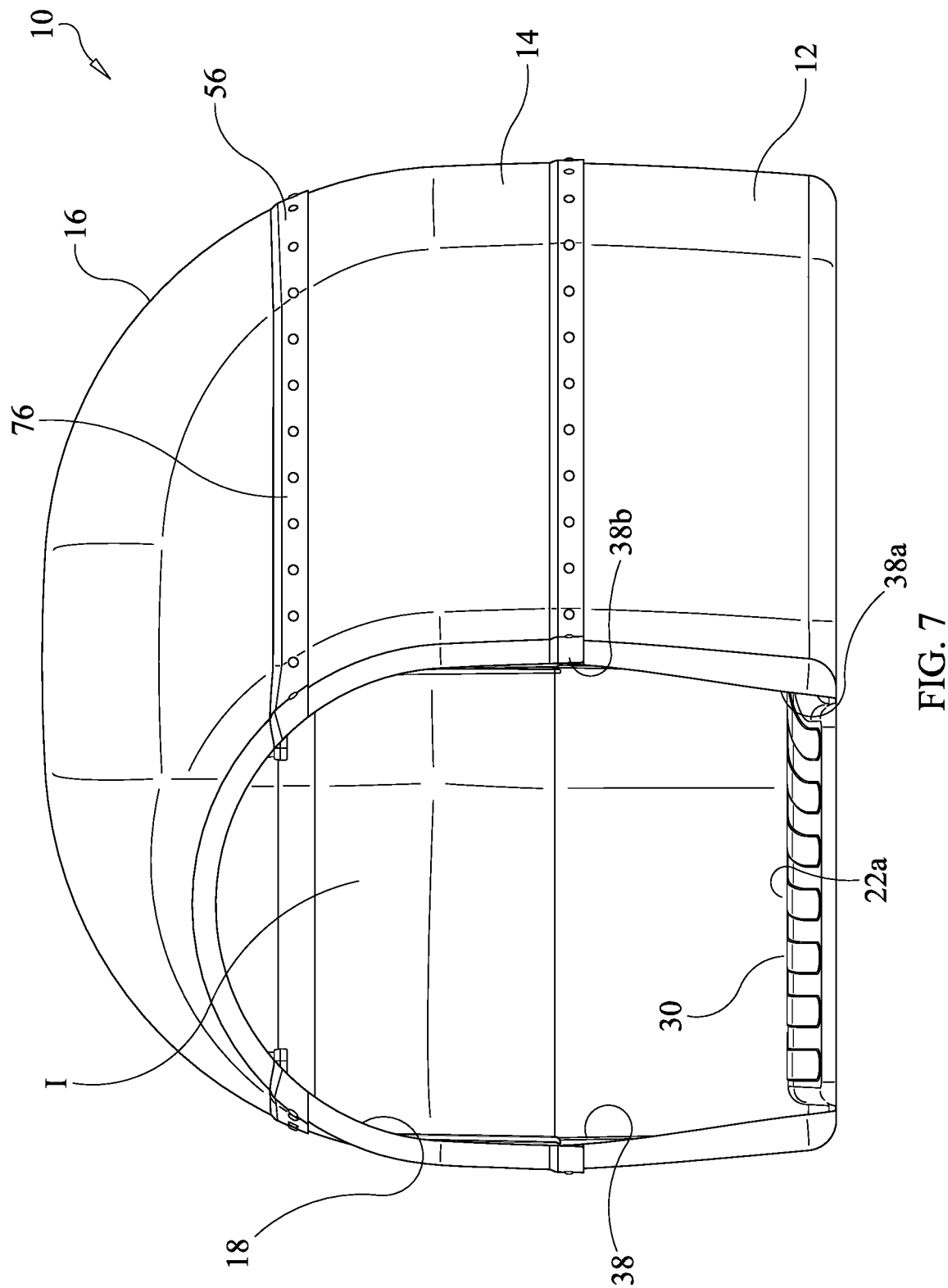
FIG. 7 is an elevational front view of the pet enclosure of FIG. 1.
Figure 8:
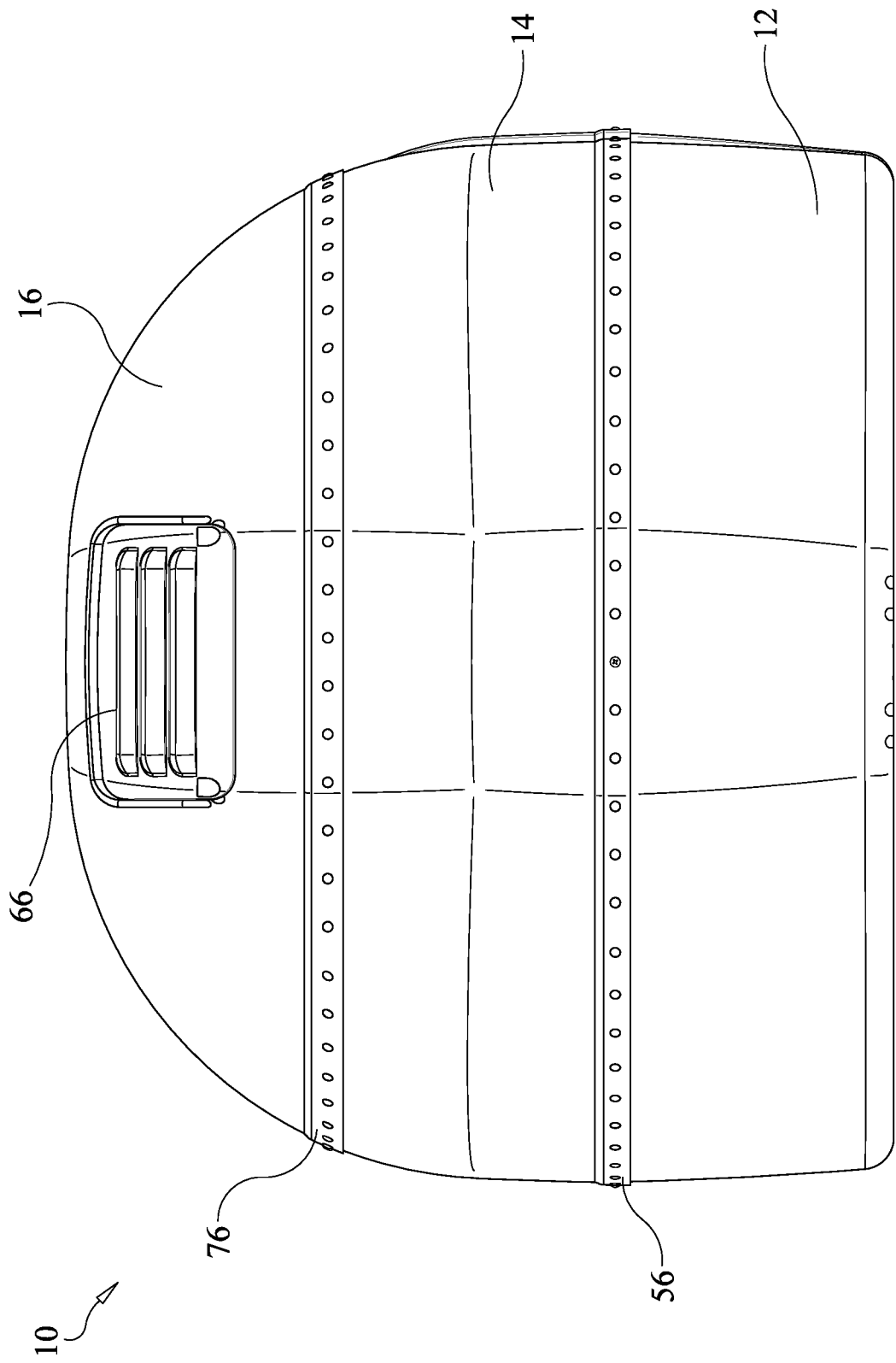
FIG. 8 is an elevational rear view of the pet enclosure of FIG. 1.

The opening 38 in the wall portion 20 has a bottom portion 38a and a top portion 38b. The opening 38 can slightly increase from the bottom portion 38a to the top portion 38b, as shown in FIG. 7. That is, as can be understood, the width of the opening 38 at the bottom portion 38a of the opening 38 is less than the width of the opening 38 at the top portion 38b.

The middle section 14 includes a wall portion 44 that is connectable to the bottom section 12. The wall portion 44 of the middle section 14 is open at both the top 44b and the bottom 44a, basically forming a throughway. The wall portion 44 of the middle section 14 has a curved configuration such that the opening at the top 44b of the wall portion 44 is smaller than at the bottom 44a of the wall portion 44.

The wall portion 44 includes an (second) opening 46 having a bottom portion 46a and a top portion 46b. The opening 46 extends outwardly from the exterior of the wall portion 44 to generally form an L-shape when viewed from above. The bottom portion 46a of the opening 46 has the same width as the top portion 38b of the opening 38. The top portion 46b of the opening 46 is inwardly curved such that a width of the top portion 46b of the opening 46 is less than a width of the bottom portion 46a of the opening 46.

Figure 3:
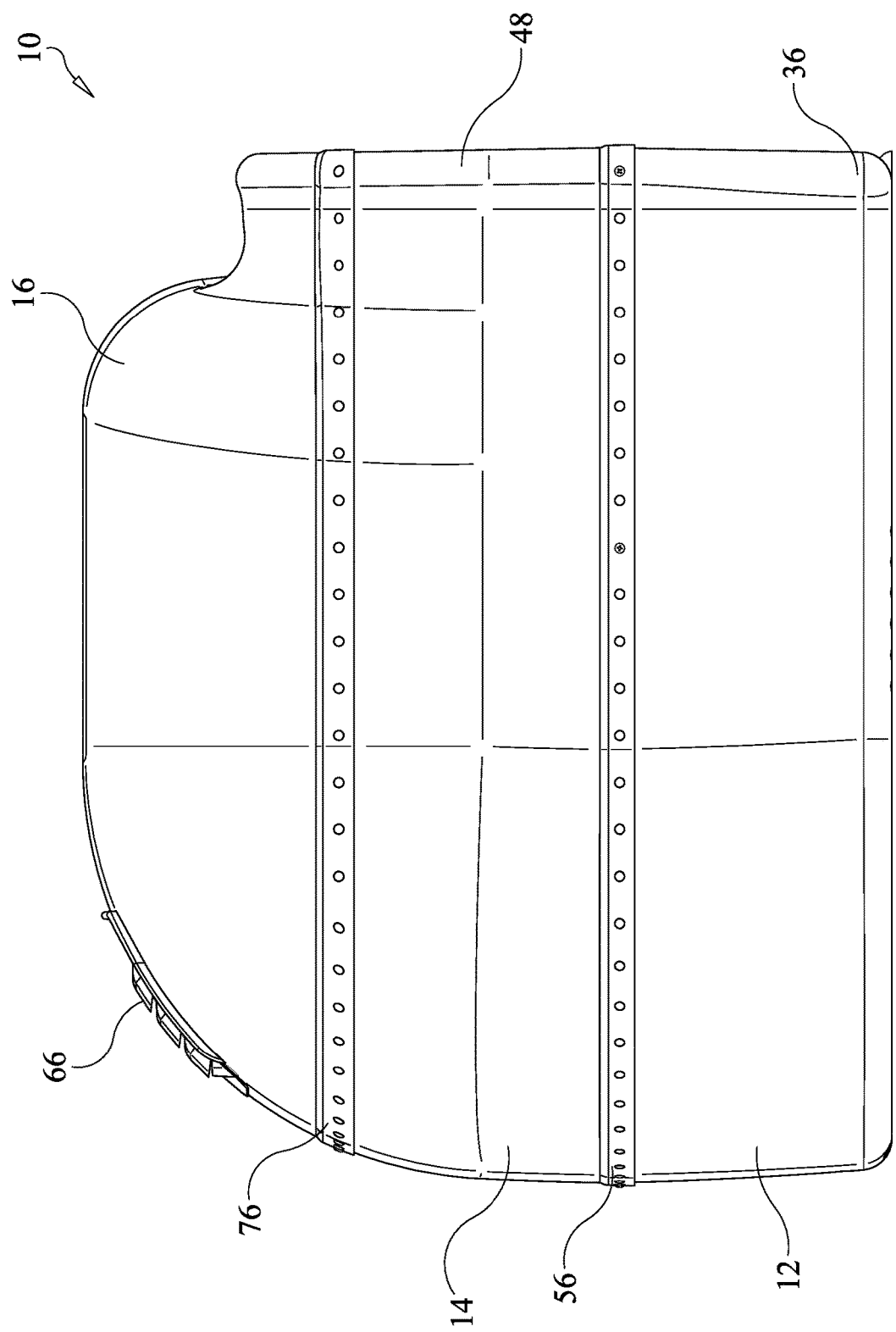
FIG. 3 is an elevational right side view of the pet enclosure of FIG. 1.
Figure 4:
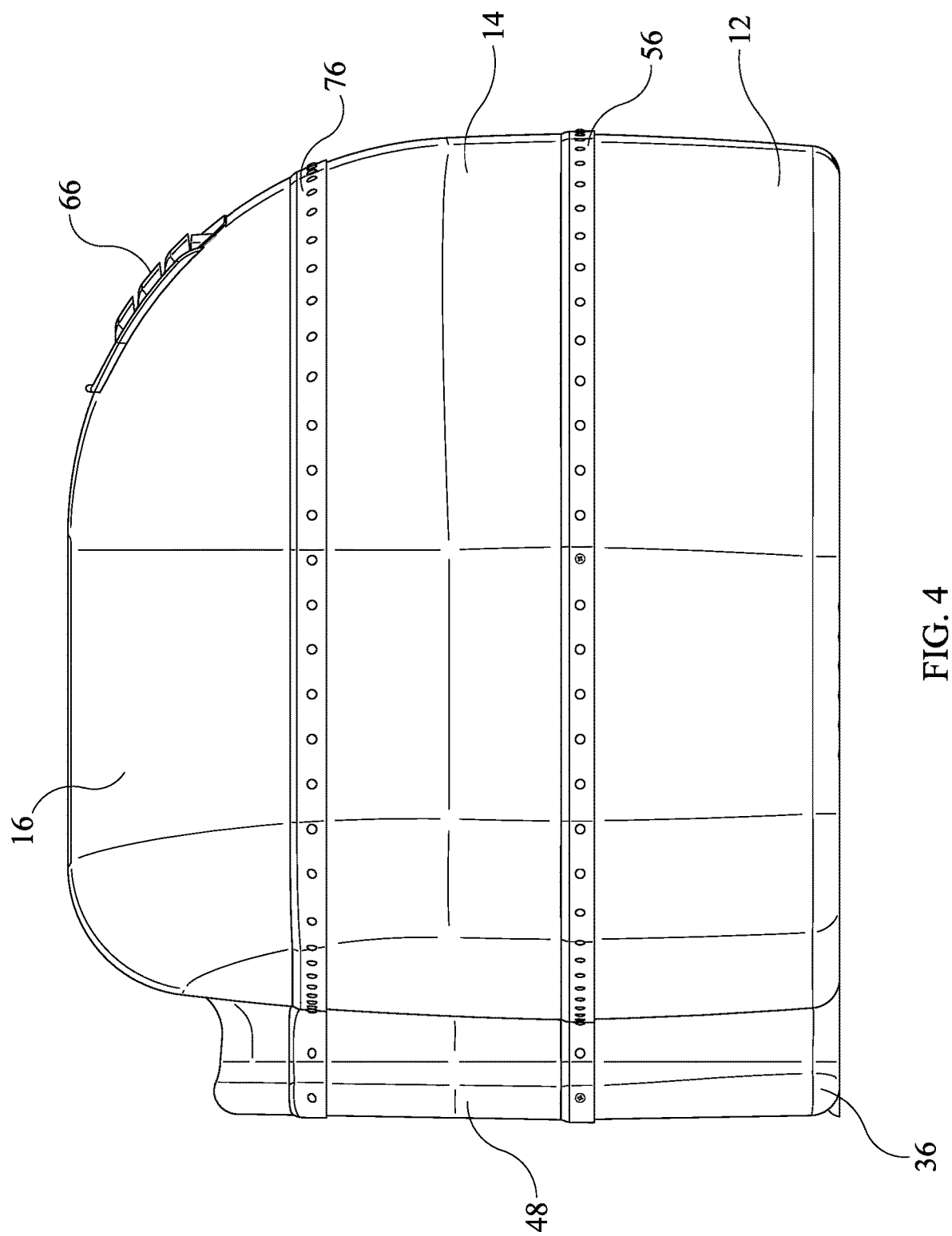
FIG. 4 is an elevational left side view of the pet enclosure of FIG. 1.

Moreover, as, noted in FIGS. 3 and 4, the wall 44 includes a protruding portion 48 adjacent the opening 46. As can be understood the protruding portion 48 corresponds to and extends substantially the same as the extended portion 36 of the bottom portion 12.

The wall portion 44 can include a plurality of longitudinal protrusions 48 that increase the strength and rigidity of the wall portion 44. In some embodiments, the longitudinal protrusions 48 can be disposed adjacent the opening 46 and along the straight areas of the wall portion 44, or any other section of the wall portion 44 which may have reduced structural integrity.

In one embodiment, the bottom 44a of the wall portion 44 of the middle section 14 includes a plurality of (second) fastening openings 50 configured to correspond to the plurality of fastening openings 42 at the top edge of the wall portion 20 of the bottom section 12. In other words the plurality of fastening openings 50 extend transversely to the direction of the wall portion 44.

Figure 10:
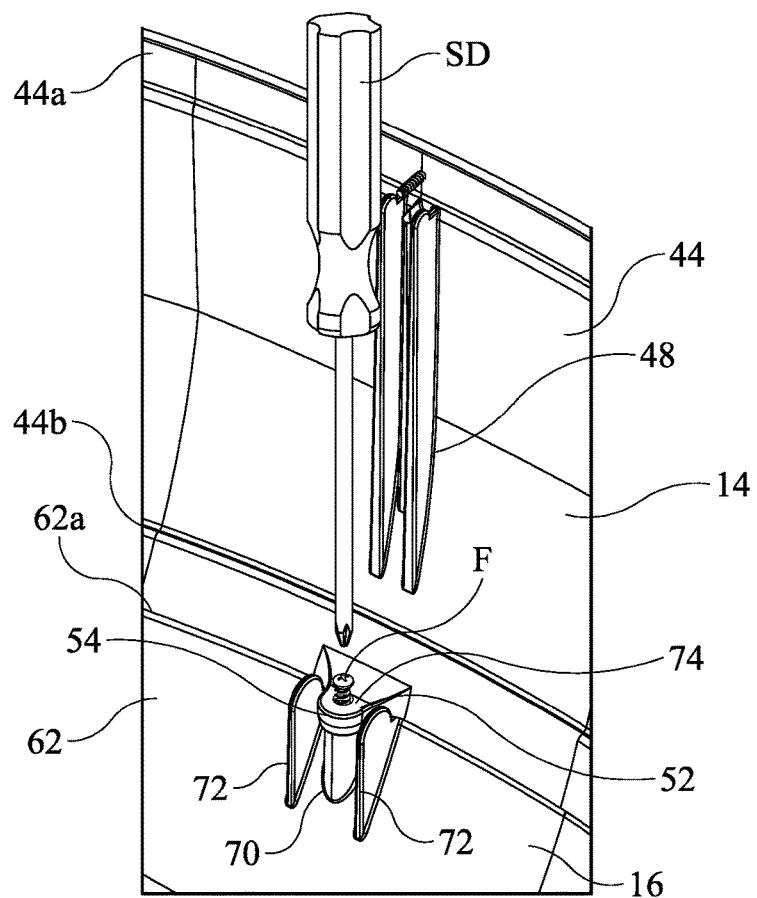
FIG. 10 is an enlarged view of the coupling of the top section to the middle section.

The top 44b of the wall portion 44 of the middle section 14 includes a plurality of (third) fastening openings 52. As illustrated in FIG. 10, the plurality of fastening openings 52 extend in the same general direction as the wall portion 44. In one embodiment, the openings 52 are disposed in protrusions 54 that extend inwardly from the wall portion 44. The protrusions 54 can be aligned with the longitudinal protrusions 48, or at an area that has increased structural rigidity.

The bottom 44a of the wall portion can include a flange portion 56 that extends outwardly father than the remainder of the wall portion 44. In other words, the flange portion 56 forms a small lip portion 56a that extends outwardly transverse to the wall portion 44 and then downwardly to form a skirt. Accordingly, as can be understood, when the middle section 14 is attached to the bottom section 12, the flange 46 overlaps an exterior surface of the top edge of the wall portion 20 of the bottom section 12. Moreover, the plurality of openings 50 can be disposed in the flange portion 56 to coincide with the longitudinal extensions 48.

In another embodiment, the top portion of the wall portion 20 of the bottom portion 12 includes an inwardly extending flange. Similarly to flange 56, this flange portion forms a small lip portion that extends inwardly transverse to the wall portion 20 and then upwardly. Thus, when the middle section 14 is attached to the bottom section 12, the flange is disposed inside the interior surface of the bottom 44b of the wall portion 44 of the middle section 14. Moreover, the plurality of openings 42 can be disposed in the flange portion to coincide with the longitudinal extensions 40.

The top section 16 is connectable to the middle section 14. The top section 16 includes a cover portion 60 and a wall portion 62. The cover portion 60 forms a domed cover and an opening 64 for a vent 66. As can be understood, the wall portion 62 of the doomed cover (i.e., the top section 16) has a bottom edge 62a and arcuate configuration. The bottom edge 62a forms an opening 68 (a third opening) at the bottom edge 62a. The opening 68 extends outwardly from the exterior of the wall portion 62 to generally form an L-shape when viewed from above.

The wall portion 62 can include a plurality of longitudinal protrusions 70 and flanges 72 that increase the strength and rigidity of the wall portion. In some embodiments, the longitudinal protrusions 70 and flanges 72 can be disposed along the straight areas of the wall portion 62, or any other section of the wall portion 62 which may have reduced structural integrity.

The opening 68 at the bottom edge 62a of the top section 16 has the same width as the top portion 46b of the opening 46. The bottom edge 62a can also include a plurality of (fourth) fastening openings 74 configured to correspond to the plurality of (third) fastening openings 52 at the top 44b of the wall portion 44 of the middle section 14. That is, in one embodiment, the bottom edge 62a of the wall portion 62 of the top section 16 includes a plurality of fastening openings 74 configured to correspond to the plurality of fastening openings 52 at the top 44b of the wall portion 44 of the middle section 14. As with the plurality of fastening openings 52, the plurality of fastening openings 74 extend in the same general direction as the wall portion 44 (and at least initially wall portion 62).

As illustrated in FIG. 10, the plurality of fastening openings 74 are disposed in protrusions 70 that extend inwardly from the wall portion 62. The longitudinal protrusions 70 can be aligned with the longitudinal protrusions 48, or at an area that has increased structural rigidity.

The bottom edge 62a of the wall portion 62 can include a flange portion 76 that extends outwardly father than the remainder of the wall portion 62. In other words, the flange portion 76 forms a small lip portion 76a that extends outwardly transverse to the wall portion 62 and then downwardly to form a skirt. Accordingly, as can be understood, when the middle section 14 is attached to the bottom section 12, the flange portion 76 overlaps an exterior surface of the top 44b of the wall portion 44 of the middle section 14. Moreover, the plurality of openings 74 can be disposed in the flange portion 76.

In another embodiment, the top 44b of the wall portion 44 of the middle portion 14 includes an inwardly extending flange portion. The flange portion, similarly to the flange portion 76 forms a small lip portion that extends inwardly transverse to the wall portion 44 and then upwardly. Thus, when the top section 16 is attached to the middle section 14, the flange is disposed inside the interior surface of the bottom edge 62a of the wall portion 62 of the top section 16. Moreover, the plurality of openings 52 can be disposed in the flange portion.

Figure 13:
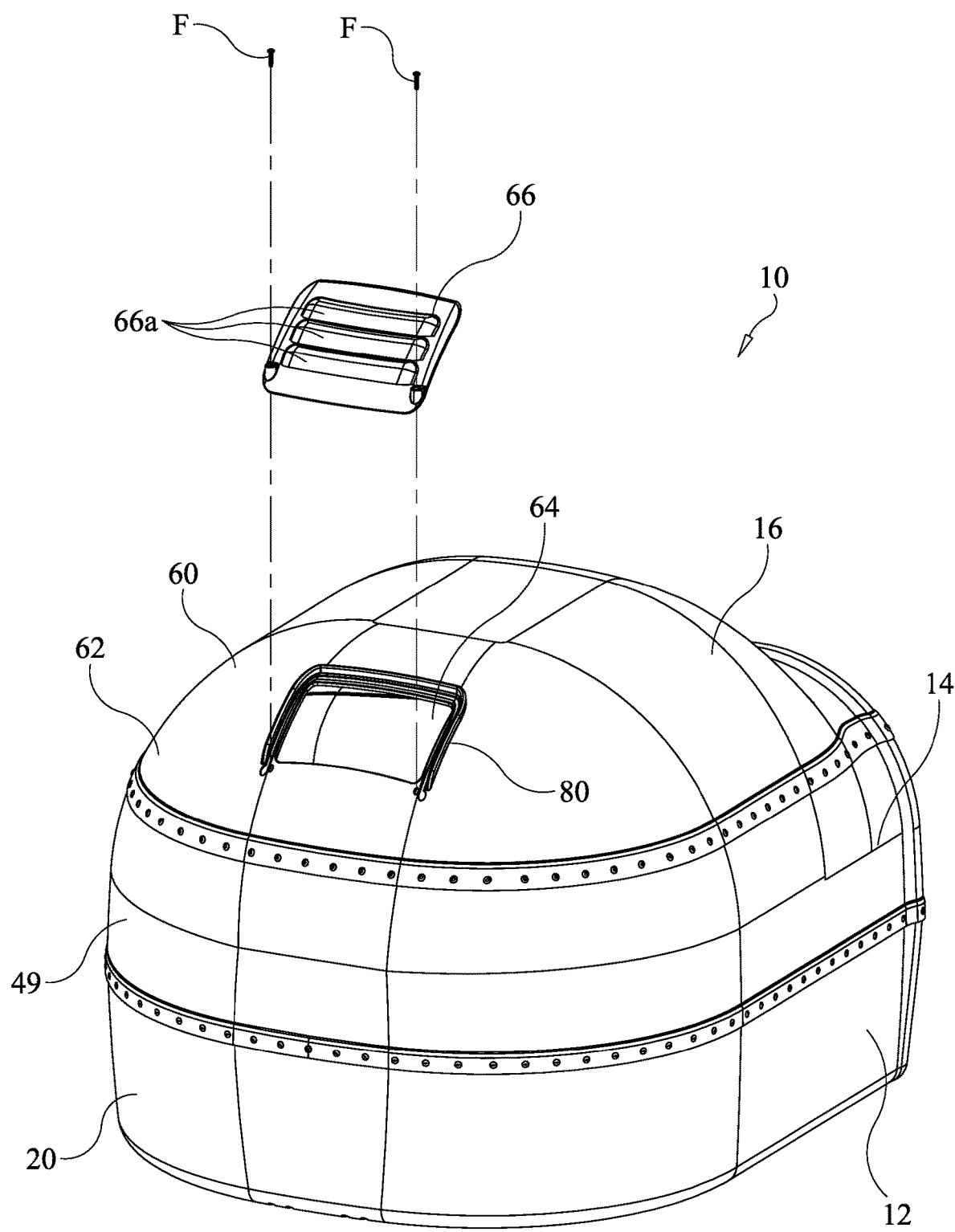
FIG. 13 is a perspective rear view illustrated the installation of a vent.

As illustrated in FIG. 13, the vent 66 can be detachably attached to the top section 16. The vent 66 is generally rectangular and includes a plurality of longitudinal slats 66a that are open to enable air to pass from the interior I of the pet enclosure 10 to the exterior. The vent 66 is sized to partially overlap the exterior surface of the top portion 16 and have a plurality of fasteners F (e.g., screws) pass through the vent 66 and secure the vent 66 to the top section 16. In one embodiment, the top section 16 has a recessed lip 80 disposed at the periphery of the opening 64. The vent 66 is configured to fit within the recessed lip 80 to form a flush surface when attached to the top section 16. It is noted that the vent 66 can be attached to the top section 16 in any manner desired and is not necessarily connected by screws. Moreover, the vent 66 can be permanently attached to the top section 16 and/or can be formed in a unitary manner with the top section 16. That is, in one embodiment, the vent 66 can be formed in the same mold and at the same time as the top section 16.

As can be understood, based on the configuration of the bottom section 12, the middle section 14 and the top section 16, the middle section 14 and top section 16, when detached, can be inverted, and stacked within the bottom section 12. This configuration reduces the size of the pet enclosure 10 for shipping and storage purposes. As can be understood, the size of the staked pet enclosure 10 will basically be the size of the bottom section 12.

When assembling the pet enclosure 10, the top section 16 and the middle section 14 are removed from the stacked position within the bottom section 12. As shown in as shown in FIGS. 9-13, the top section 16 is connected to the middle section 14. In one embodiment, the top section 16 can be laid on the ground in an inverted or upside down manner. A plurality of fasteners F (e.g., in this embodiment 5 fasteners) are inserted from below using, for example a screw driver SD, through the plurality of fastener openings 52 in the middle section 14 and into the plurality of fastener openings 74 in the top section 16. These fastener openings secure the top section 16 to the middle section 14. It is noted that while 5 fasteners F are illustrated as being inserted from the bottom direction to the top direction, any number of fasteners F can be used, and the fasteners F can couple to the top section 16 to the middle section 14 in any manner desired. Further, the top section 16 can be connected to the middle section 14 in any manner desired and is not necessarily limited to fasteners.

Figure 11:
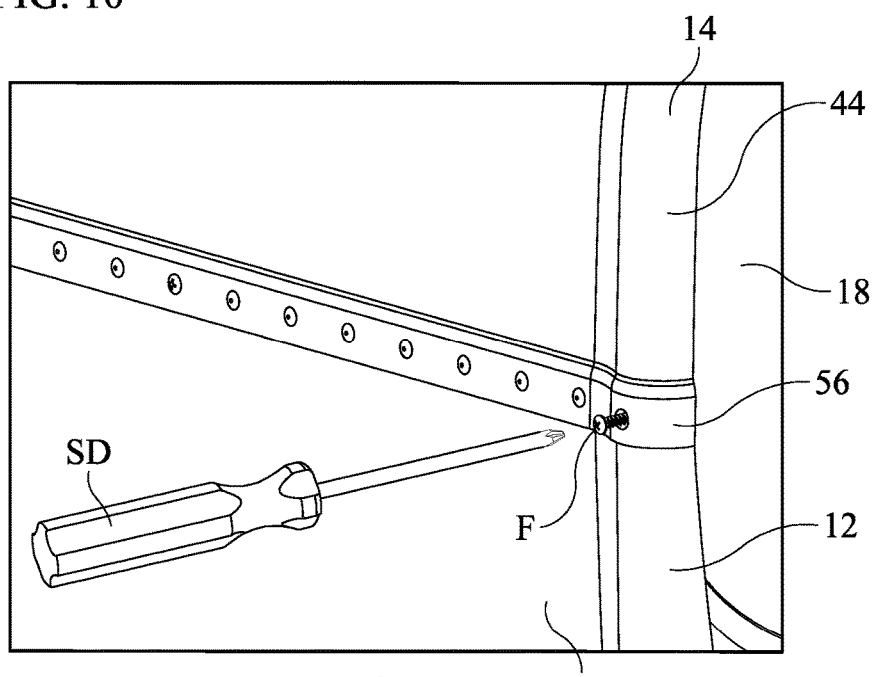
FIG. 11 is an enlarged view of the coupling of the middle section to the bottom section.

As shown in FIGS. 11 and 12, the middle section 14 is positioned on the bottom section 12 and plurality of fasteners F (e.g., in this embodiment 5 fasteners) are inserted from the exterior to the interior transverse to the direction of the plurality of fasteners F inserted into openings 52 and 74. These fasteners F secure the middle section 14 to the bottom section 12. It is noted that while 5 fasteners are illustrated as being inserted from the exterior to the interior, any number of fasteners F can be used, and the fasteners F can couple to the middle section 14 to the bottom section 12 in any manner desired. Further, the middle section 14 can be connected to the bottom section 12 in any manner desired and is not necessarily limited to fasteners F.

Finally, as shown in FIG. 13, the vent 66 is positioned over the opening 64 in the top section 16, and a plurality of fasteners F (e.g., in this embodiment 2 fasteners) are inserted from the exterior to the interior in the same general direction as the plurality of fasteners inserted into openings 52 and 74. These fasteners F secure the vent 66 to the top section 16. It is noted that while 2 fasteners are illustrated as being inserted from the exterior to the interior, any number of fasteners can be used, and the fasteners F can couple to the vent 66 to the top section 16 in any manner desired. Further, the vent 66 can be connected to the top section 16 in any manner desired and is not necessarily limited to fasteners.

Figure 5:
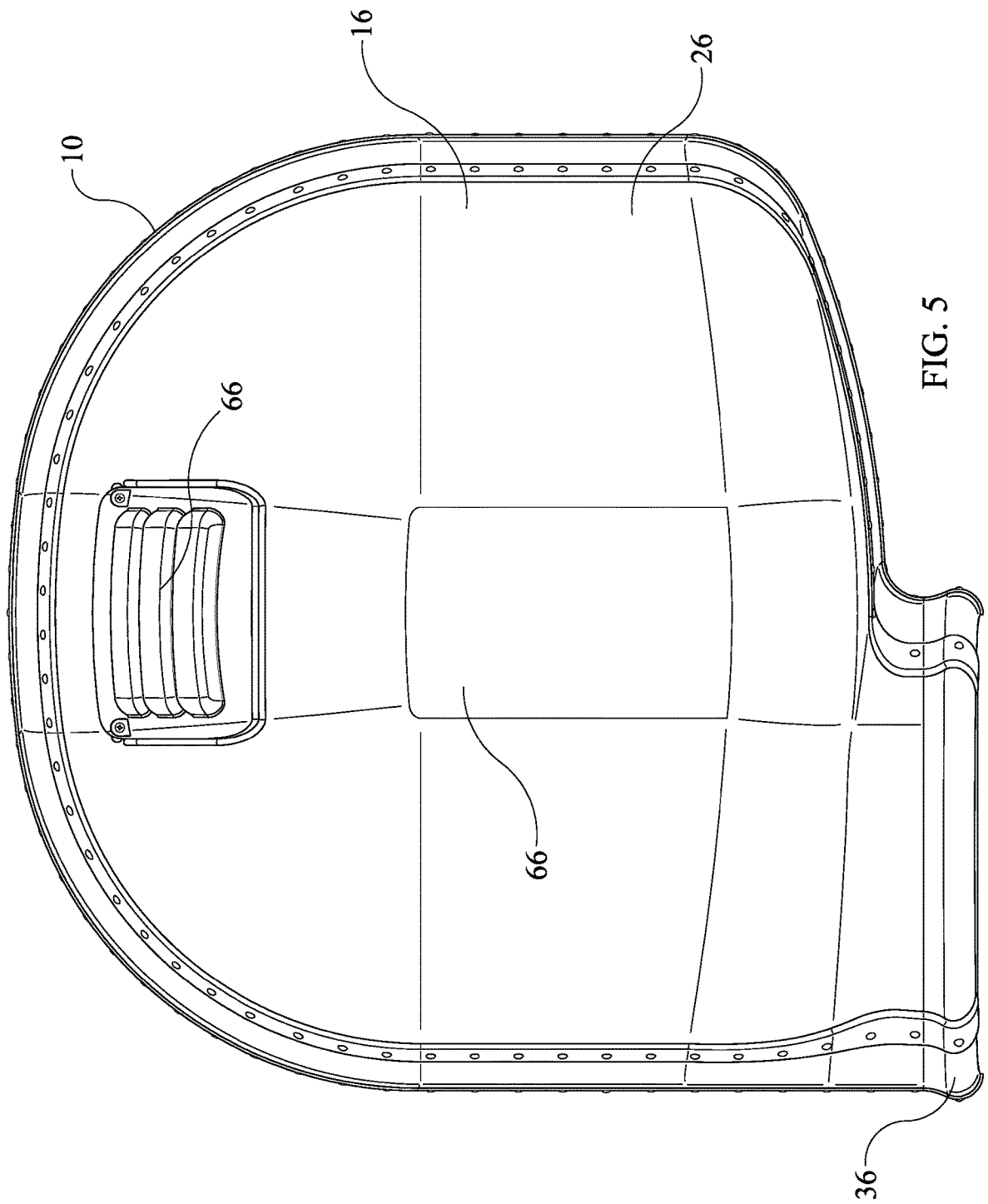
FIG. 5 is top plan view of the pet enclosure of FIG. 1.
Figure 6:
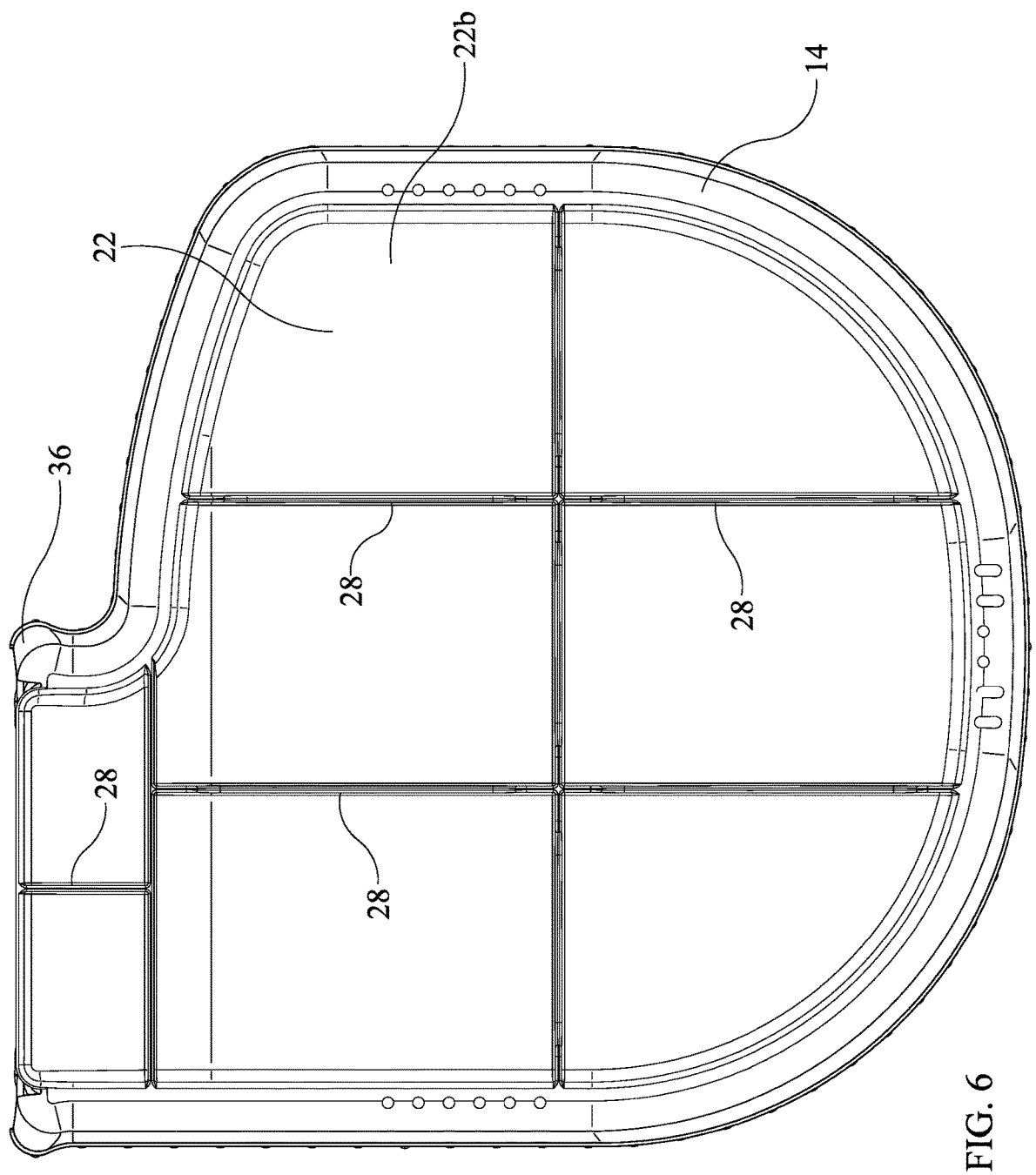
FIG. 6 is a bottom plan view of the pet enclosure of FIG. 1.

As noted in FIGS. 1 and 5-7, the assembled pet enclosure 10 forms an opening 18 into the pet enclosure 10. The opening 18 is an entry that is offset from the center of the pet enclosure 10. Moreover, the entry extends outwardly from the periphery of the remainder of the pet enclosure 10 so as to generally form an L-shape when viewed from above or below, as illustrated in FIGS. 5 and 6. The entry in the embodiments described herein is high relative to the height of the overall height of the pet enclosure 10. As shown in FIGS. 3, 4 and 7, the entry while not as tall as the peak of the top section 16 is relatively large and encompasses the entire bottom and middle sections 12 and 14 and approximately one third of the top section 16. This high design, along with the offset position of the entry provides an entry that has a larger appearance than the conventional pet enclosures.

The embodiments of the present invention provide a pet enclosure 10 that is a sturdy and reliable prefabricated pet enclosure 10 that be assembled and reassembled without excessive wear and tear is desired. Additionally, these aspects of the present invention, and additional aspects as described herein provide a pet enclosure 10 that can be stored and transported using a minimal amount of space while providing a large amount of interior space for the pet after the pet enclosure 10 is assembled is desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "section," "portion," or "element" when used in the singular can have the dual meaning of a single part or a plurality of parts. Also as used herein to describe the above embodiments, directional terms refer to those directions of a pet enclosure 10 in a normal and useful position. Accordingly, these terms, as utilized to describe the present invention should be interpreted relative to a pet enclosure 10.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A pet enclosure comprising:
    a bottom section having a floor portion and a wall portion extending from the floor portion, the wall portion including a first opening having a bottom portion and a top portion, the wall portion including one or more longitudinal protrusions that increase the strength and rigidity of the wall portion;
    a middle section connectable to the bottom section, the middle section including a wall portion, the wall portion of the middle section including a second opening having a bottom portion and a top portion, the bottom portion of the second opening having a same width as the top portion of the first opening so as to connect to with the first opening, and the top portion of the second opening being inwardly curved such that a width of the top portion of the second opening is less than a width of the bottom portion of the second opening;
    a top section connectable to the middle section, the top section including a cover portion and a wall portion, the cover portion forming a domed cover, and the wall portion including a third opening having a bottom portion and a top portion, the bottom portion of the third opening having a same width as the top portion of the second opening so as to connect with the second opening, and the top portion of the third opening being arcuate,
    the bottom section, middle section and top section when connected together forming an enclosed pet enclosure with an animal opening therein, the bottom section having a groove disposed between the wall portion of the bottom section and a surface of an interior surface of the floor portion, the groove having at least one drainage hole; and
    a ground stake received by at least one of the drainage holes when the pet enclosure is in an assembled state.

2. The pet enclosure according to claim 1, wherein the top section includes an opening for a vent.

3. The pet enclosure according to claim 1, wherein the animal opening forms an offset entry into the enclosed pet enclosure.

4. The pet enclosure according to claim 1, wherein the bottom edge of the wall of the top section includes a flange portion that overlaps an exterior surface of the top edge of the wall of the middle section.

5. The pet enclosure according to claim 1, wherein an interior surface of the floor portion is raised relative to a surface on which the pet enclosure is to be position.

6. The pet enclosure according to claim 1, wherein the wall portion of the bottom portion includes a plurality of first fastening openings at a top edge thereof, a bottom edge of the wall portion of the middle section includes a plurality of second fastening openings configured to correspond to the plurality of first fastening openings at the top edge of the wall portion of the bottom section, and a top edge of the wall portion of the middle section includes a plurality of third fastening openings, and a bottom edge of the wall portion of the top section including a plurality of fourth fastening openings configured to correspond to the plurality of third fastening openings at the top edge of the wall portion of the middle section.

7. A method of assembling a pet enclosure, the method comprising:
connecting a middle section to a bottom section, such that a top portion of a first opening of the bottom section coincides with a bottom portion of a second opening of the middle section, and a top portion of the second opening being inwardly curved such that a width of the top portion of the second opening is less than a width of the bottom portion of the second opening, the wall portion including one or more longitudinal protrusions that increase the strength and rigidity of the wall portion;
connecting a cover portion to the middle section so as to form a domed cover, and such that a bottom portion of a third opening in a wall of the cover portion coincides with a top portion of the second opening in the middle section, and the top portion of the third opening being arcuate;
the bottom section, middle section and top section when connected together forming an enclosed pet enclosure with an animal opening therein, the bottom section having a groove disposed between the wall portion of the bottom section and a surface of an interior surface of the floor portion, the groove having at least one drainage hole; and
disposing a ground stake through the bottom section so to be received by at least one of the drainage holes.

8. The method according to claim 7, wherein the top section includes an opening for a vent.

9. The method according to claim 7, wherein the animal opening forms an offset entry into the enclosed pet enclosure.

10. The method according to claim 7, wherein the bottom edge of the wall of the top section includes a flange portion that overlaps an exterior surface of the top edge of the wall of the middle section.

11. The method according to claim 7, wherein an interior surface of the floor portion is raised relative to a surface on which the pet enclosure is to be position.

12. The method according to claim 7, wherein at least one of the drainage holes is configured to receive a ground stake.

13. The method according to claim 7, further comprising fastening the middle section to the bottom section by inserting fasteners through a plurality of first fastening openings at the top edge of the wall portion of the bottom section and a plurality of second fastening openings at a bottom edge of the wall portion of the middle section, and
fastening the top section to the middle section by inserting fasteners through a plurality of third fastening openings at a top edge of the wall portion of the middle section and a plurality of fourth fastening openings at a bottom edge of the wall portion of the top section.

14. The pet enclosure according to claim 1, wherein the groove extends around a perimeter of the floor portion.

15. The pet enclosure according to claim 1, wherein the floor portion includes a mat having a series of grooves molded onto the floor portion.

16. The pet enclosure according to claim 1, wherein the middle section and the top section are stackable within the bottom section in an inverted and detached state.

* * * * *